(12) United States Patent
Hang et al.

(10) Patent No.: US 10,210,563 B2
(45) Date of Patent: Feb. 19, 2019

(54) SEARCH MACHINE WITH DYNAMICALLY UPDATED FLAG ON GRAPHICAL SLIDER

(71) Applicant: Hipmunk, Inc., San Francisco, CA (US)

(72) Inventors: Nancy Tu Hang, San Francisco, CA (US); Carly Lane Lodge, San Francisco, CA (US); Phillip Aquilina, Millbrae, CA (US)

(73) Assignee: Hipmunk, Inc., San Francisco, CA (US)

( * ) Notice: Subject to any disclaimer, the term of this patent is extended or adjusted under 35 U.S.C. 154(b) by 1003 days.

(21) Appl. No.: 14/665,753

(22) Filed: Mar. 23, 2015

(65) Prior Publication Data

US 2016/0283091 A1 Sep. 29, 2016

(51) Int. Cl.
| | |
|---|---|
| G06F 3/048 | (2013.01) |
| G06Q 30/06 | (2012.01) |
| G06Q 10/02 | (2012.01) |
| G06Q 50/14 | (2012.01) |

(52) U.S. Cl.
CPC ......... *G06Q 30/0641* (2013.01); *G06Q 10/02* (2013.01); *G06Q 30/0625* (2013.01); *G06Q 50/14* (2013.01)

(58) Field of Classification Search
CPC .. G06F 17/30241; G06F 17/30; G06F 21/604; G06F 17/3087; G06F 9/451; G06F 3/0481; G06F 3/0482; G06F 17/246; G06F 17/30265; G06F 19/321; G06F 3/0485; G06F 8/60; G06F 9/44526; G06F 9/452; G06F 17/30943; G06F 3/038; G06F 3/04817; G06F 3/04842; G06F 3/0488
See application file for complete search history.

(56) References Cited

U.S. PATENT DOCUMENTS

| | | | |
|---|---|---|---|
| 6,204,846 B1* | 3/2001 | Little | G06F 3/04855 715/784 |
| 2008/0282169 A1* | 11/2008 | Chang | G06F 17/30873 715/733 |
| 2015/0312184 A1* | 10/2015 | Langholz | H04L 51/04 715/753 |

* cited by examiner

*Primary Examiner* — Di Xiao
(74) *Attorney, Agent, or Firm* — Schwegman Lundberg & Woessner, P.A.

(57) ABSTRACT

Example embodiments described herein disclose a travel search machine configured to retrieve and present search results as graphical elements within a graphical user interface. The travel search machine presents graphical elements with a slider configured to define a subset of the search results, where the subset is defined by a location of the slider among the graphical elements within the graphical user interface, and is further configured to receive a user input that moves the slider from a first location in the graphical user interface to a second location in the graphical user interface and in response to the first user input, cause the user device to display a notification window in the graphical user interface at a position relative to the slider in the first location, the notification window indicating a count of search results within the subset of search results defined by the location of the slider.

20 Claims, 11 Drawing Sheets

FIG. 9

| Cheapest trip from $1,179 | 21 of 21 flights. See all from $1,179 | | | | | |
|---|---|---|---|---|---|---|
| | ① Select Departure<br>SJC → Yerevan, Wednesday, Apr 1 | | | ② Select Return<br>Yerevan→SJC, Thursday, Apr 30 | | |
| | 602 | (No flights left!) 1002<br>1:55 am ⊙takeoff<br>Thu, Apr 2 1000 | Fri, Apr 3 704 | Sat, Apr 4<br>⟨landing⊙4 | | |
| Total trip price/person | | | | | | |
| Select Leg $1,179+ | | | 1 return option | | | |
| Select Leg $1,699+ | | | 2 return options | | | |
| Select Leg $1,799+ | | | 4 return options | | | |
| Select Leg $1,699+ | | ↑ 706 | 5 return options | | | |
| Select Leg $2,375+ | | | 1 return option | | | |
| Select Leg $2,946+ | | | 4 return options | | | |
| | | | Send Hi | | | |

SEARCH MACHINE WITH DYNAMICALLY UPDATED FLAG ON GRAPHICAL SLIDER

TECHNICAL FIELD

The subject matter disclosed herein generally relates to machines configured for processing data. Specifically, the present disclosure addresses machines and methods that facilitate presenting search results in a graphical user interface.

BACKGROUND

Websites have enabled users to search for a variety of products and services. Some allow a user to purchase or reserve a product or service selected by the user. More specifically, in the travel industry, a number of websites exist for a user to search for and make reservations and bookings of one or more travel options, such as airline flights and hotel stays. To book flights, for example, an airline may have a website that a user can use to search for fares and purchase tickets. Concurrently, online travel agents exist which combine travel options from several airlines, giving the user a greater selection than may be obtained from a single airline.

A user may operate a machine (e.g., a device) to execute a search of one or more databases and obtain corresponding search results from the executed search. For example, a travel website may operate a machine (e.g., a travel search machine) that provides one or more travel search services to one or more devices belonging to one or more users. The travel search machine may be configured (e.g., by suitable software executing on a processor of the travel search machine) to receive a search request containing search criteria, and retrieve search results from a database, and cause a device of a user to display a presentation of search results.

BRIEF DESCRIPTION OF THE DRAWINGS

Some embodiments are illustrated by way of example and not limitation in the figures of the accompanying drawings.

FIG. 9 is a diagram illustrating a search result presentation interface including one or more search results as graphical icons, and a slider, according to some example embodiments.

FIG. 10 is a diagram illustrating a search result presentation interface including a slider and a dynamically updated header flag indicating that there are no search results remaining within a graphical user interface

DETAILED DESCRIPTION

Figure 1:
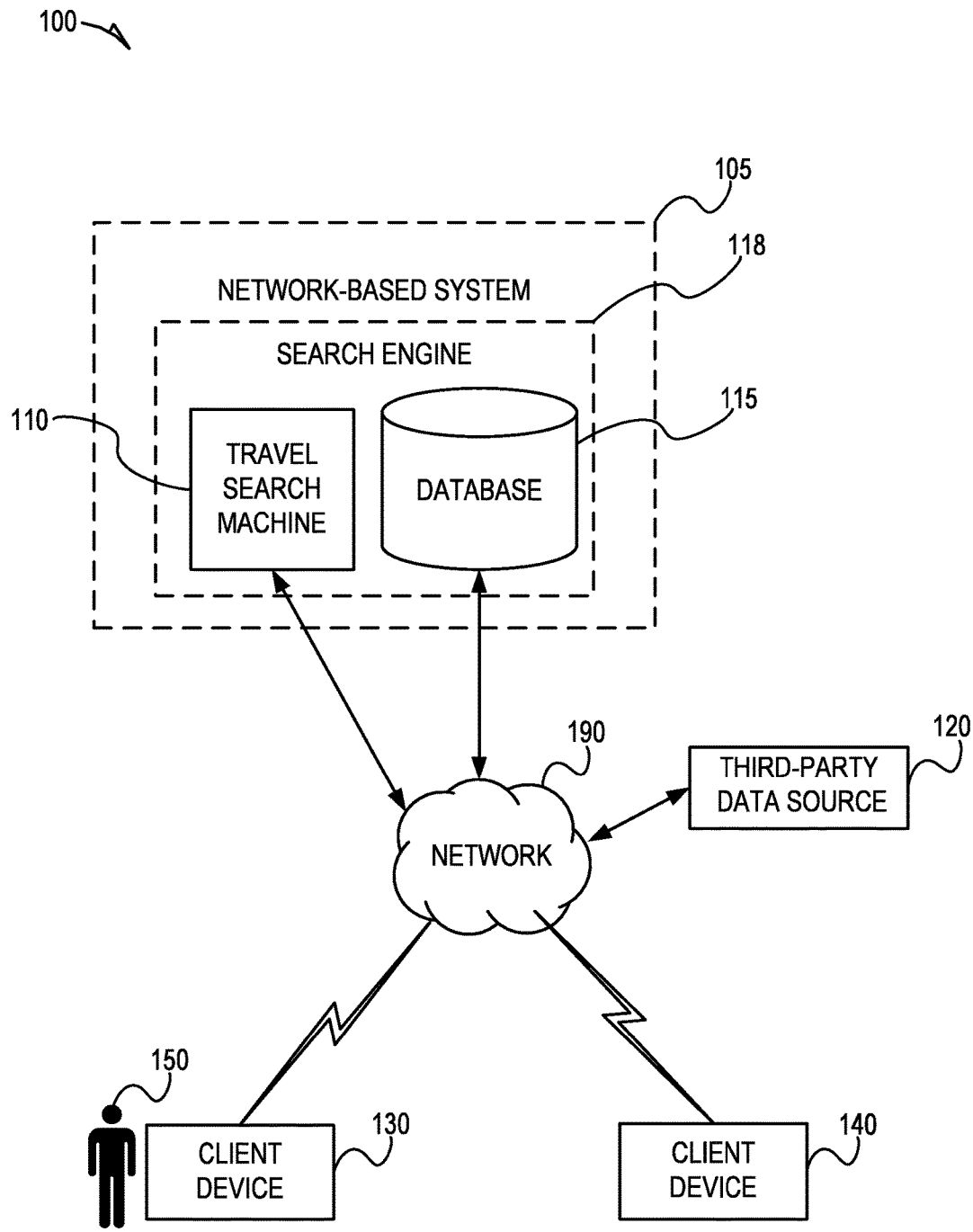
FIG. 1 is a network diagram illustrating a network environment suitable for presenting and sharing search results as trip objects, according to some example embodiments.

Example embodiments described herein disclose a travel search machine (e.g., in an online search environment), configured to retrieve and present search results as graphical elements within a graphical user interface. The travel search machine may be or include a group of one or more server machines configured to provide one or more search engine services. A user device may accordingly request and receive, from the travel search machine, a set of one or more search results based on a submitted search criteria. The travel search machine may then cause the user device to present at least some of the received search results within a graphical user interface, and in some example embodiments, may further facilitate the sharing of the received search results with one or more additional users. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The travel search machine is configured (e.g., by one or more suitable modules that include one or more processors) to retrieve and present search results (e.g., airline flights) as graphical elements in a graphical user interface. Graphical elements are those elements used by a graphical user interface to offer consistent visual representations of data objects displayed within the graphical user interface. The travel search machine presents the graphical elements with a slider configured to define (e.g., fully or at least partially) a subset of the search results, where the subset is defined (e.g., in whole or at least in part) by a location of the slider among the graphical elements within the graphical user interface. A graphical element can be a shape (e.g., a rectangle or oval), an icon, a bar, or a combination thereof.

In some example embodiments, the travel search machine presents the search results along an axis within the graphical user interface, where the axis represents a parameter of the search results (e.g., departure time, arrival time). For example, the travel search machine may present the search results as graphical elements along the axis, arranging the graphical elements from an earliest departure or arrival time, to a latest departure or arrival time. The travel search machine displays the slider intersecting the axis at a location among the search results, where the location of the slider defines a threshold value of the parameter (e.g., departure time, arrival time) represented by the axis.

According to various example embodiments, the travel search machine is configured to receive a user input that moves the slider from a first location in the graphical user interface to a second location in the graphical user interface. For example, a user may initiate movement of the slider by a first user input that selects the slider (e.g., via a cursor, or on a touch enabled device), via a user device on which the travel search machine causes the graphical user interface to be displayed. In response to the first user input, the travel search machine causes the user device to display a notification window in the graphical user interface and at a position relative to the slider in the first location. In some example embodiments, the travel search machine maintains the position of the notification window relative to the slider at the second location of the slider within the graphical user interface. The notification window displays a count of search results in the subset (e.g., a first subset) of the search results, and the subset may be at least partially defined by the location (e.g., the first location) of the slider. The user may conclude the movement of the slider via a termination of the first user input (e.g., a drag input) moving the slider to a subsequent location (e.g., a second location) within the graphical user interface. The termination of the first user input causes the notification window to update and display a count of search results within the subset (e.g., the second subset) defined by the subsequent location of the slider (e.g., the second location) in the graphical user interface. Thus, as the user drags the slider from a first location in the graphical user interface to a subsequent location, the notification window updates (e.g., continually and dynamically) to display a count of search results within the subset defined by the location of the slider at any given time. When the count of search results in the subset defined by the location of the slider is zero, the notification window may display a phrase indicating that there are no search results to be shown (e.g., "No flights left!").

In some example embodiments, the search results include a set of parameters (e.g., prices, flight duration, or number of connections) with corresponding values (e.g., a price in dollars or a flight duration in hours). The notification window may display a value of a parameter from the parameters of the search results within a subset defined by the location of the slider, in addition to the count of search results in the subset. For example, in response to receiving the first user input initiating the movement of the slider, the travel search machine may cause the notification window to appear and to display the count of the search results within the subset defined by the first location of the slider, as well as a lowest price value from the set of price values corresponding to the search results within the first subset. Thus, as described above, as the user drags the slider from the first location to a subsequent location, the notification window dynamically updates to display a count of search results and a lowest price corresponding to the search results within the subset of search results defined by the location of the slider in the graphical user interface.

As an illustrative example from a user perspective, suppose a user named Dale launches a mobile app on his smartphone, and the mobile app allows Dale to access the travel search machine in order to search for flight options. Dale may first provide the travel search machine with search criteria that specify parameters of his desired flight, such as travel dates, a departure airport, and an arrival airport. The travel search machine retrieves and presents a set of search results (e.g., retrieved based on at least the search criteria) as graphical elements (e.g., icons or shapes) along the axis within the graphical user interface. The axis represents a departure time of the flights.

Dale may then move the slider from the first position in the graphical user interface (e.g., the position in which the slider was initially displayed) to a second position along the axis, to define an earliest departure time. The position of the slider in relation to the graphical elements at least partially defines a subset of the search results (e.g., search results with departure times later than a time specified by the slider). Dale may initiate movement of the slider by, for example, selecting the slider with a user input via a cursor. When Dale selects the slider to initiate the movement, the notification window appears as a header flag above the slider, and the notification window displays the set of search results within the subset of search results at least partially defined by the location of the slider. For example, if the slider is at a position on the axis corresponding to an 8:00 am earliest departure time, only flights with an 8:00 am or later departure time will be displayed. The header flag will then display a count of search results having an 8:00 am or later departure time, as well as a lowest price among the subset of search results. As Dale moves the slider along the axis, the header flag appears to dynamically update itself to include a count of search results in the subset defined by the location of the slider, and a lowest price within the subset. Thus, as Dale narrows the range of acceptable departure times, fewer and fewer search results will remain within the subset defined by the location of the slider, and the header flag will appear to update itself accordingly. Once Dale decides on a preferred earliest departure time, he can place the slider at a corresponding location by releasing the slider. The travel search machine will then cause the header flag to disappear. In this way, Dale is able to see how many search results remain in real time as he varies the departure time, in addition to a lowest price among the available results in the subset defined by the location of the slider. Dale can apply this same method to setting a threshold value for the corresponding arrival times.

FIG. 1 is a network diagram illustrating a network environment 100 suitable for operating a travel search machine 110, according to some example embodiments. The network environment 100 includes the travel search machine 110, a database 115, a third-party data source 120, and client devices 130 and 140, operated by a user 150 (e.g., Dale) all communicatively coupled to each other via a network 190. The travel search machine 110, with or without the database 115, may form all or part of a search engine 118 (e.g., a travel search engine, a hotel search engine, a shopping search engine, a news search engine, or any suitable combination thereof). In addition, the search engine 118 may form all or part of a network-based system 105 (e.g., a cloud-based server system configured to provide one or more services, such as search engine services, to the client devices 130 and 140). The third-party data source 120 may be or include a database (e.g., similar to database 115). In some example embodiments, the third-party data source 120 is a web server machine operated by a third-party (e.g., a business entity distinct from the business entity that operates the travel search machine 110). The travel search machine 110, the database 115, the third-party data source 120, and the client devices 130 and 140 may each be implemented in a computer system, in whole or in part, as described below with respect to FIG. 11.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the message machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
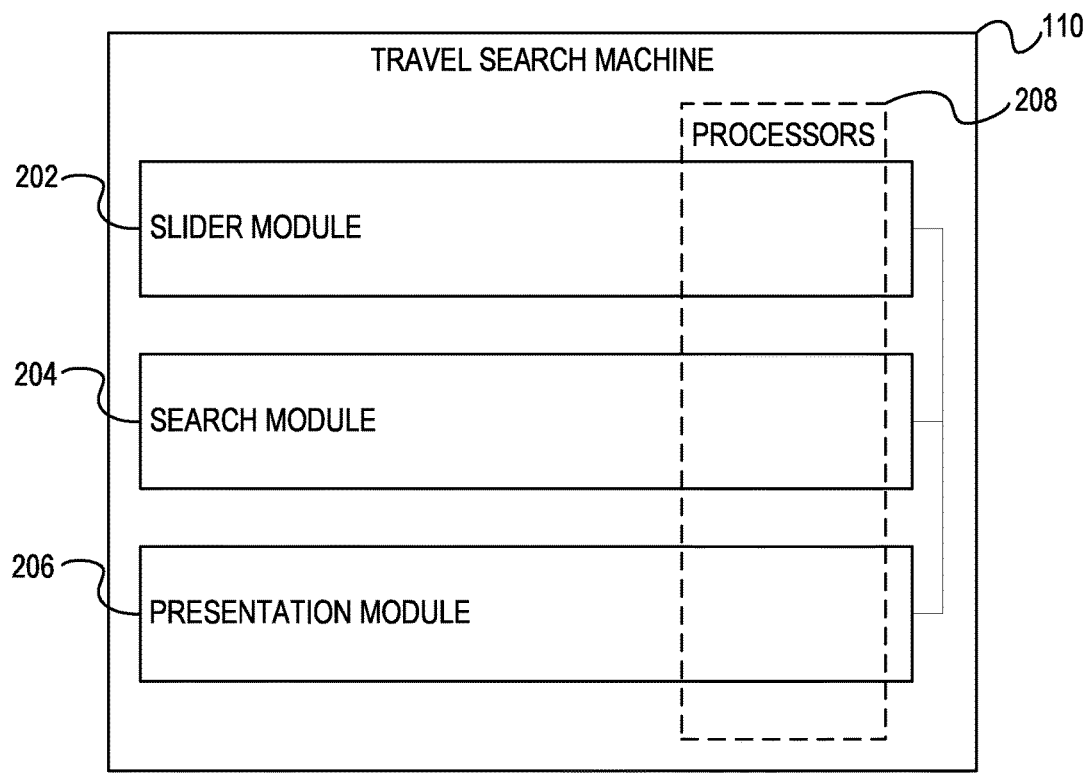
FIG. 2 is a block diagram illustrating components of a travel search machine suitable for generating and presenting a dynamically updated header flag, according to some example embodiments.

FIG. 2 is a block diagram illustrating components of the travel search machine 110 that configure the travel search machine 110 to generate and present a dynamically updated header flag, according to some example embodiments. The travel search machine 110 is shown as including a slider module 202, a search module 204, and a presentation module 206, all configured to communicate with each other (e.g., via a bus, shared memory, or a switch). Any one or more of these modules may be implemented using one or more processors 208 and hence may include one or more of the processors 208 (e.g., by configuring such one or more processors to perform functions described for that module).

Any one or more of the modules described may be implemented using hardware alone (e.g., one or more of the processors 208 of a machine) or a combination of hardware and software. For example, any module described of the travel search machine 110 may physically include an arrangement of one or more of the processors 208 (e.g., a subset of or among the one or more processors of the machine) configured to perform the operations described herein for that module. As another example, any module of the travel search machine 110 may include software, hardware, or both, that configure an arrangement of one or more processors 208 (e.g., among the one or more processors of the machine) to perform the operations described herein for that module. Accordingly, different modules of the travel search machine 110 may include and configure different arrangements of such processors 208 or a single arrangement of such processors 208 as different points in time. Moreover, any two or more modules of the travel search machine 110 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
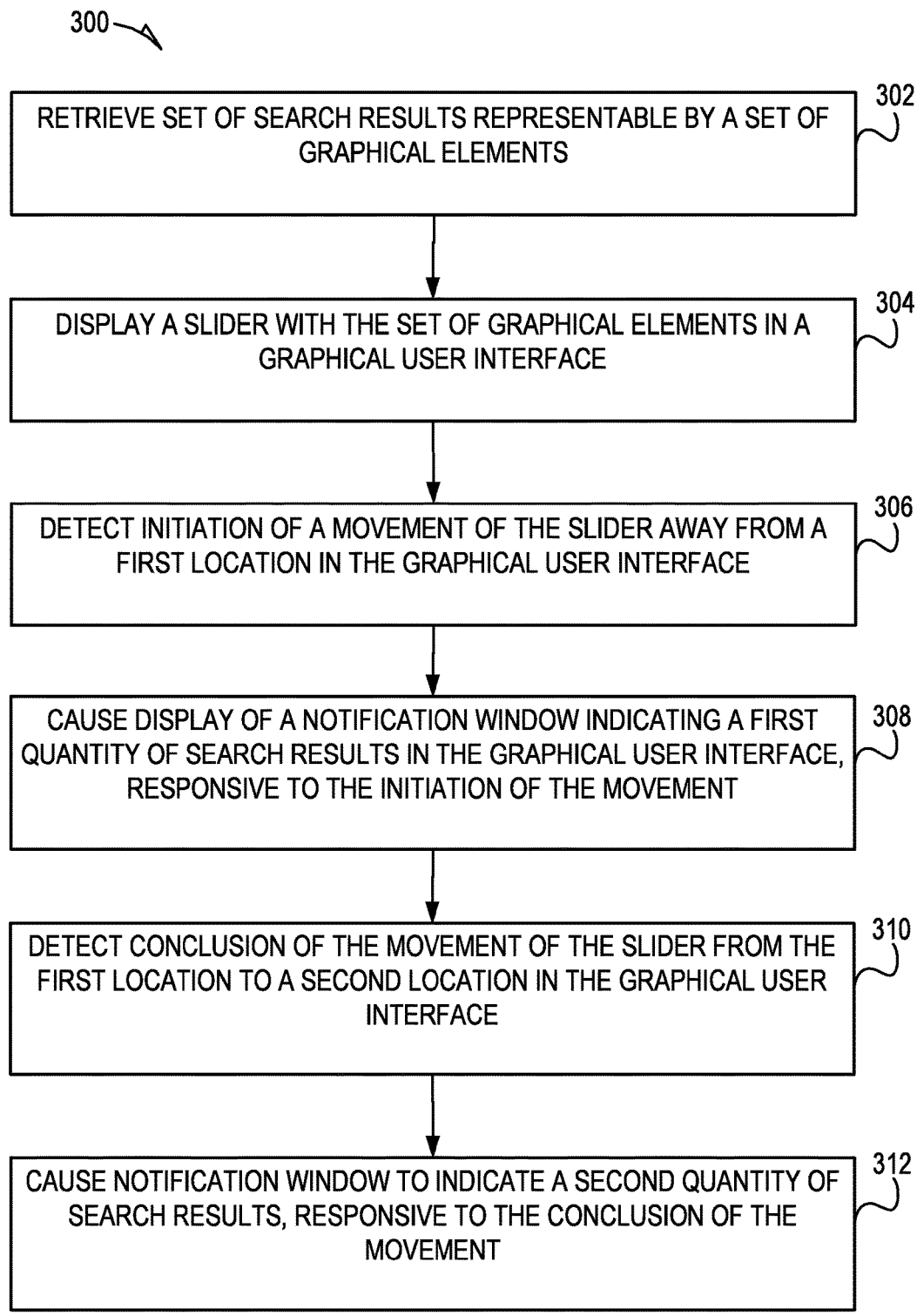
FIG. 3 is a flowchart illustrating operations of the travel search machine in performing a method of generating and presenting a dynamically updated header flag, according to some example embodiments.

FIG. 3 is a flowchart illustrating operations of the travel search machine 110 in performing a method 300 of generating and presenting a dynamically updated header flag, according to some example embodiments. Operations of the method 300 may be performed by the modules described above with respect to FIG. 2. As shown in FIG. 3, the method 300 may include operations 302, 304, 306, 308, 310 and 312.

In operation 302, the search module 204 receives one or more search criteria submitted by the user (e.g., the user 150). The search module 204 may then retrieve and present a set of search results based on at least some of the search criteria submitted by the user. This may be performed by searching the database 115 for the search results (e.g., a particular airline flight, or accommodations), selecting the search results based on at least some of the search criteria submitted by the user, and retrieving and providing the search results to client device 130 via presentation module 206. The presentation module 206 may present the search results along an axis within the graphical user interface, where the axis represents a parameter of the search results (e.g., departure time, or arrival time).

In some example embodiments, the one or more search criteria may be or include a keyword submitted by the user as a text based search in a search field within the trip creation interface. In other example embodiments, search criteria may be retrieved through geolocation of the client device 130, predefined preferences set by the user via client device 130, or as a selection made by the user from selectable search criteria options presented in a search criteria menu (e.g., a selectable list of: airlines, departure cities, arrival cities, departure times, arrival times, or price options) presented in a graphical user interface.

In operation 304, the slider module 202 generates and displays a slider intersecting the axis at a location in the graphical user interface, where the location of the slider in the graphical user interface defines a threshold value of a subset of the graphical elements (e.g., search results), and where the subset of search results may include all or some of the set of search results retrieved based on at least the search criteria and the threshold value. The slider is represented as a line segment having an end, and in some example embodiments, the slider module 202 is configured to receive a user input via the line segment, where the user input initiates the movement of the slider from a first location in the graphical user interface to a subsequent location in the graphical user interface.

In operation 306, the slider module 202 detects a user input initiating the movement of the slider away from a first location in the graphical user interface to a subsequent location in the graphical user interface. As discussed with reference to operation 304, in some example embodiments the slider module 202 is configured to receive a user input via the slider. The user input initiating the movement of the slider may include a selection of the slider by a cursor controlled via client device 130. For example, the user may select the slider by positioning the cursor at a position on the slider via a mouse (e.g., input/output device 1112) of the client device 130, and depressing a button of the mouse. In alternative embodiments, if the user is viewing the search results on a touch enabled device, the user may select the slider through a tactile input on the touch enabled device by placing a finger directly onto the slider on the graphical user interface.

In operation 308, responsive to detecting the user input initiating the movement of the slider, the presentation module 206 causes display of a notification window indicating a first quantity of search results within the subset of the search results defined by the location of the slider in the graphical user interface. In some example embodiments, the presentation module 206 causes the display of the notification window as a header flag which appears at a position relative to the slider in the graphical user interface, and where the header flag maintains the same relative position to the slider in the graphical user interface as the slider moves to a subsequent location. For example, responsive to receiving the user input initiating the movement of the slider, the presentation module 206 may cause the header flag to appear at a location contiguous to the slider. As the user moves the slider from the first location to the subsequent location, the header flag maintains the same contiguous location to the slider.

The presentation module 206 is further configured to cause the header flag to indicate a quantity of search results corresponding to the subset of search results defined by at least the location of the slider and the threshold value defined by the location of the slider in the graphical user interface. For example, the subset of search results may include all or some of the search results, and where the quantity of search results is represented by a numerical value. Thus, responsive to receiving the user input initiating the movement of the slider from the first location in the graphical user interface, the presentation module 206 causes the header flag to appear and indicate the quantity of search results in the subset defined by the threshold value defined by the first location of the slider. The quantity of search results may be represented as a natural number (e.g., 1, 2, 3, etc.).

In operation 310, the slider module 202 detects a conclusion of the movement of the slider from the first location to a second location (e.g., the subsequent location) in the graphical user interface. The user concludes the movement of the slider by placing the slider at the subsequent location within the graphical user interface.

In operation 312, responsive to detecting the conclusion of the movement at the second location in the graphical user interface, the slider module 202 causes the header flag (e.g., notification window) to indicate a second quantity of search results (e.g., a second quantity of search results) within the second subset of the search results defined by the subsequent location (e.g., the second location) of the slider within the graphical user interface. In this way, the notification window is dynamically updated, in real-time, to display a count of search results corresponding to the subset defined by the search criteria and the threshold value defined by the location of the slider in the graphical user interface.

Figure 4:
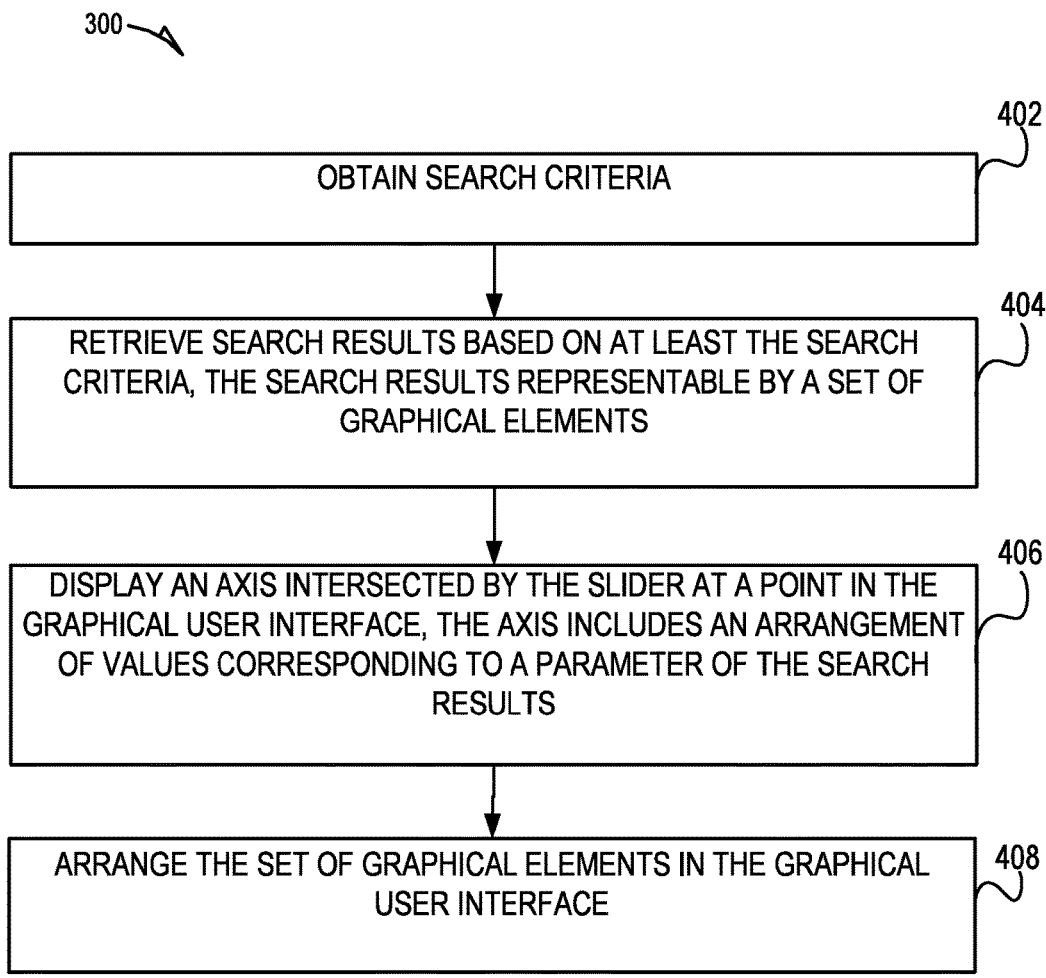
FIG. 4 is a flowchart illustrating operations of the travel search machine in performing a method of retrieving and presenting search results as a set of graphical elements within a graphical user interface, according to some example embodiments.

As shown in FIG. 4, one or more operations 402, 404, 406, and 408 may be performed as part (e.g., a precursor task, a subroutine, or portion) of operation 302 of method 300, in which the search module 204 retrieves and presents search results as a set of graphical elements within a graphical user interface, according to some example embodiments.

Operation 402 may be performed by the search module 204, with respect to the client device 130. For example, a user accessing the travel search machine 110 is presented with a search criteria input field by the search module 204, within the graphical user interface. The search criteria input field may include a text field, as well as a menu of one or more selectable search criteria. In some embodiments, the travel search machine 110 is configured to receive search criteria as a text input from client device 130, or as a spoken submission. In other embodiments, the user may opt to select search criteria from among a list of search criteria presented in a search menu within the graphical user interface.

In operation 404, the search module 204 retrieves a set of search results, where the set of search results are representable by a set of graphical elements (e.g., icons, shapes) based on at least the search criteria. The search results may include, for example, be one or more flight options representable as graphical elements.

In operation 406, the presentation module 206 displays an axis intersected by a slider in the graphical user interface. The axis may represent a parameter of the search results, and include an arrangement of values corresponding to the parameter. For example, the search results may include corresponding arrival or departure times, and the axis may include an arrangement of arrival or departure times. Furthermore, in some example embodiments, the slider and the axis may intersect at a point of intersection, where the point of intersection defines a threshold value of the parameter represented by the axis.

In operation 408, the presentation module 206 arranges the graphical elements (e.g., the search results) in the graphical user interface along the axis. In some example embodiments, the presentation module 206 is configured to arrange the graphical elements according to the parameter values included in the axis. For example, the presentation module 206 may arrange the graphical elements in locations parallel to the axis on the graphical user interface, such that the parameter values of the axis define the locations of the search results represented by the graphical elements, based on the corresponding parameter values of the search results.

Figure 5:
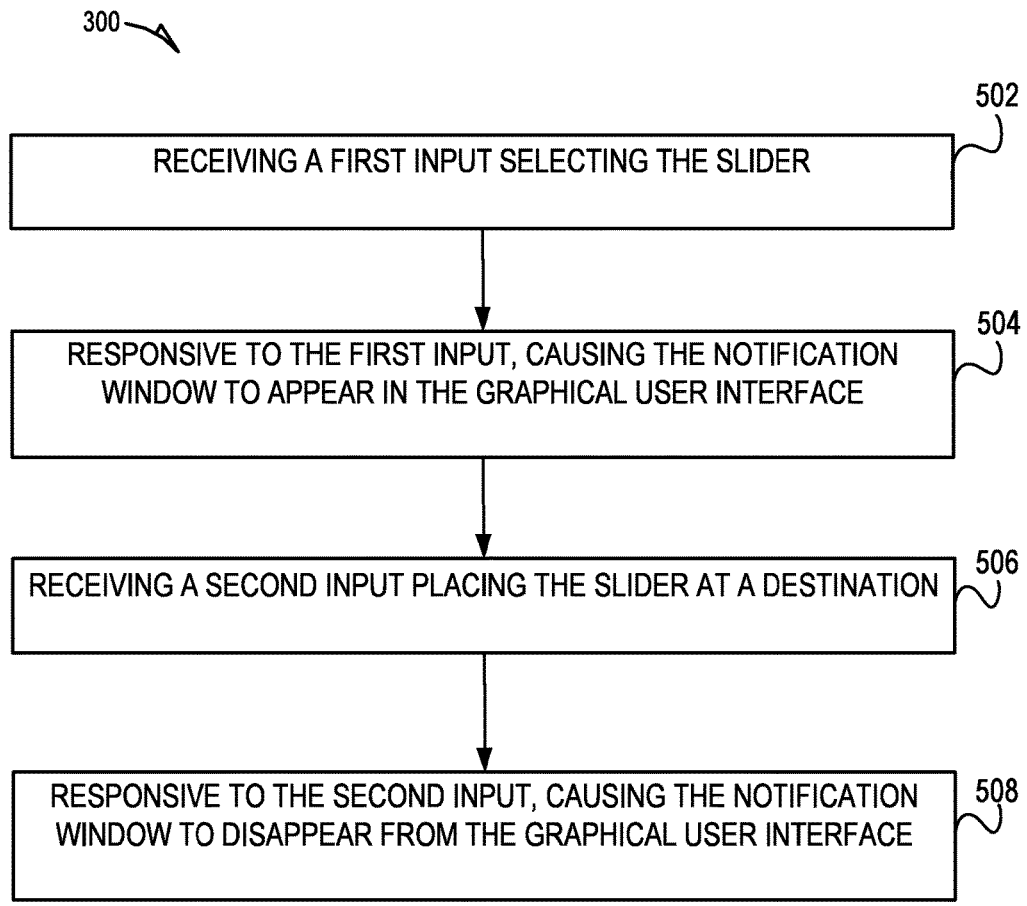
FIG. 5 is a flowchart illustrating operations of the travel search machine in performing a method of causing the presentation of a notification window, according to some example embodiments.

In FIG. 5, one or more operations 502, 504, 506, and 508 may be performed as part (e.g., a precursor task, a subroutine, or portion) of the method 300, in which the presentation module 206 generates and presents a dynamically updated header flag, according to some example embodiments.

Operation 502 may be performed by the slider module 202, with respect to client device 130, as part (e.g., a precursor task, a subroutine, or portion) of operation 306. As discussed in operation 306 of method 300, the slider module 202 detects a user input initiating the movement of the slider away from a first location in the graphical user interface. At operation 502, the slider module 202 receives the first input, where the first input selects the slider. In some example embodiments, the slider may be selected by positioning a cursor controlled by a mouse (e.g., input/output device 1112) of a client device 130 at a location on the slider, and depressing a button of the mouse. In embodiments where the client device 130 is a touch enabled device, the slider may be selected through a tactile input received from the user.

Operation 504 may be performed by the presentation module 206, with respect to client device 130, as part (e.g., a precursor task, a subroutine, or portion) of operation 308. As discussed at operation 308, responsive to detecting the first input, the presentation module 206 causes display of a notification window indicating a first quantity of search results within the subset of the search results defined by the location of the slider in the graphical user interface. At operation 504, responsive to the selection of the slider, the presentation module 206 is configured to cause the notification window (e.g., the header flag) to appear (e.g., materialize, become visible) at a position in the graphical user interface relative to the slider, such that the header flag maintains the relative position to the slider as the slider is moved to the subsequent location in the graphical user interface.

Operation 506 may be performed by the slider module 202, with respect to client device 130. At operation 506, the slider module 202 receives a second input from the user device placing the slider at the subsequent location (e.g., the second location) within the graphical user interface. The second input finalizes the subsequent location of the slider as the second location of the slider. For example, as discussed with respect to the first user input selecting the slider above, the slider may be selected by positioning the cursor over the slider with the mouse of the client device 130, and depressing the mouse button of the mouse, which may then enable the user to drag the slider to the subsequent location. Once the user has identified a location (e.g., the second location) within the graphical user interface to place the slider, the user may finalize the location of the slider by the second input, where the second input may include releasing the mouse button, placing the slider at the subsequent location.

Operation 508 may be performed by the presentation module 206, with respect to client device 130. At operation 508, responsive to placing the slider at the second location, the presentation module 206 causes the header flag to disappear (e.g., become invisible, fade away) from the graphical user interface.

Figure 6:
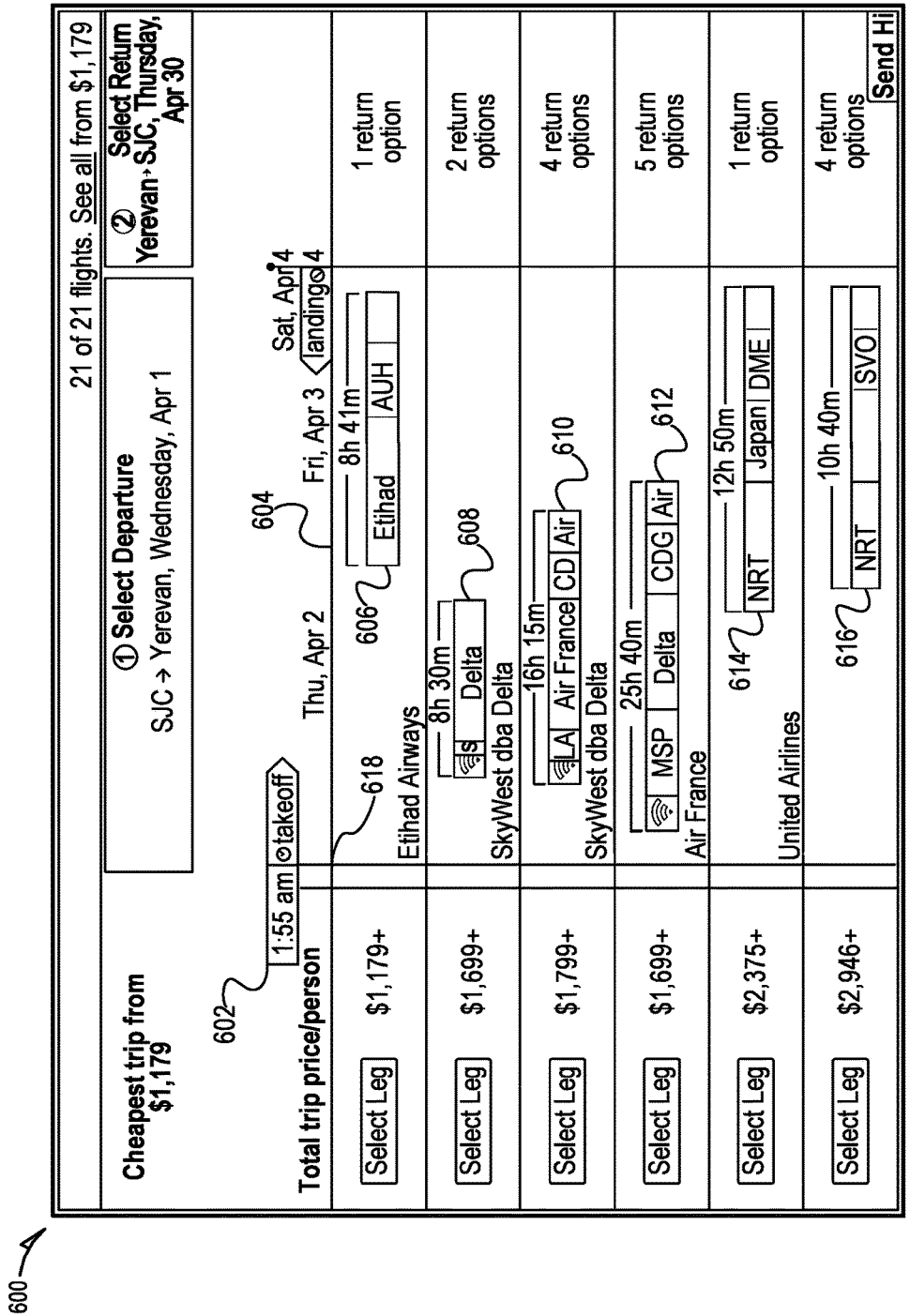
FIG. 6 is a diagram illustrating a search result presentation interface including one or more search results as graphical elements, and a slider within a graphical user interface, according to some example embodiments.

FIG. 6 is a diagram of a graphical user interface 600 (e.g., search presentation interface) to display the presentation of search results on client device 130, having a slider 602, intersecting an axis 604 at a first location 618, and search results represented as graphical elements 606, 608, 610, 612, 614, and 616. The search presentation interface 600 may be configured as an interactive webpage or an interactive application screen (e.g., of the travel search machine 110) that allows a user 150 to view search results represented as graphical elements (e.g., 606, 608, 610, 612, 614, and 616).

The slider 602 is shown as a line segment having a display at a first end, where the display indicates a value of the parameter at the first location 618 of the axis. For example, as shown in FIG. 6, the point of intersection (e.g., the first location 618) of the slider 602 and the axis 604 represents a time (e.g., 1:55 am). As the user moves the slider 602 along the axis 604, the display varies/updates to indicate the value corresponding to the point of intersection of the slider 602 with the axis 604.

The slider 604 includes an arrangement of values corresponding to a parameter of the search results. As shown in FIG. 6, the axis 604 represents a time or date corresponding to the search results, such that the search results may be arranged in the graphical user interface at locations corresponding to the values indicated on the axis 604. Thus, the graphical elements 606, 608, 610, 612, and 614 are shown at locations in the graphical user interface relative to the values as they are arranged on the axis 604.

Figure 7:
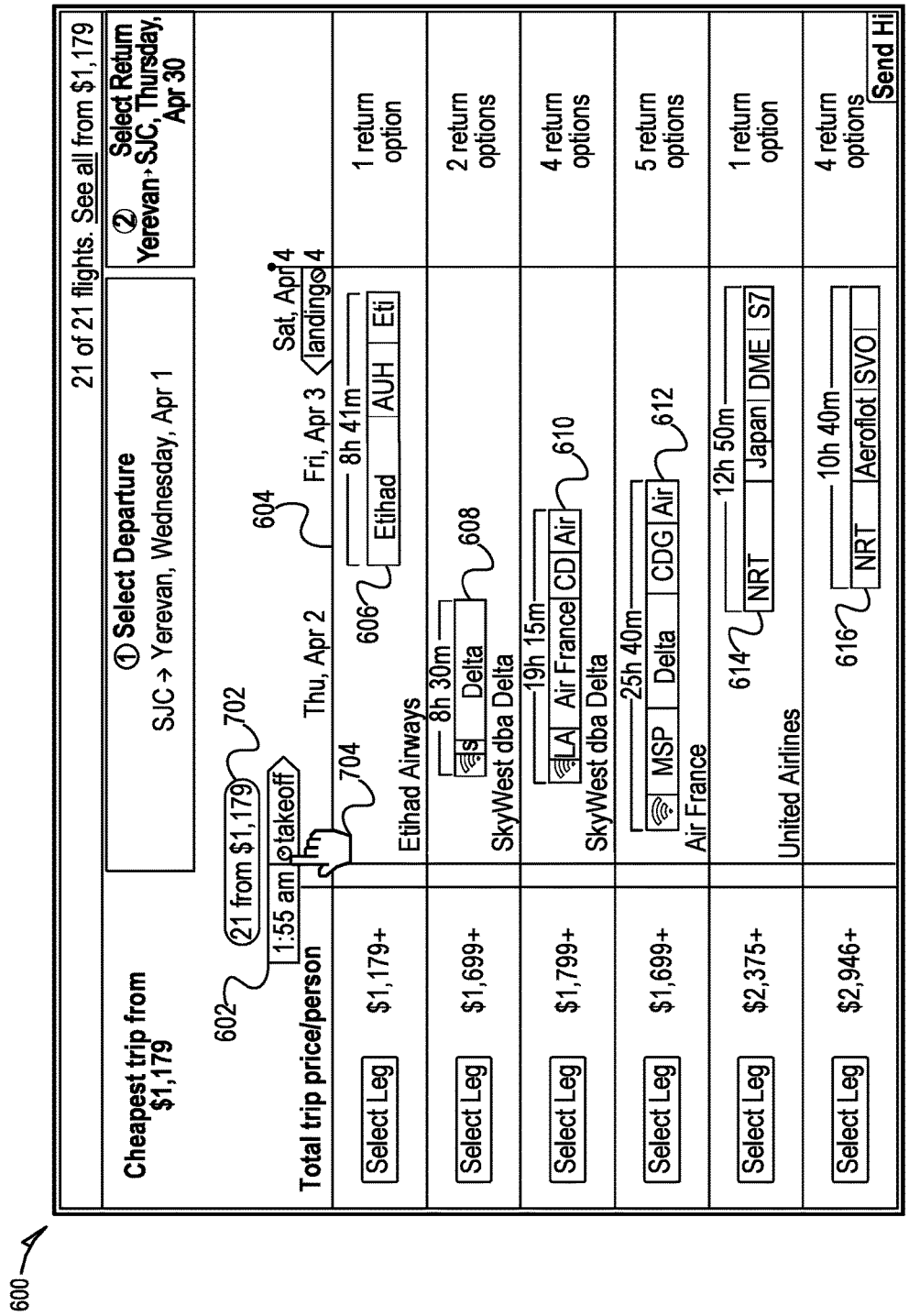
FIG. 7 is a diagram illustrating a search result presentation interface including one or more search results as graphical icons, a slider, and a dynamically updated header flag within a graphical user interface, according to some example embodiments.

FIG. 7 is a diagram illustrating a first user input initiating the movement of the slider 602 within the search presentation interface 600, including the slider 602, the axis 604, the search results represented as graphical elements 606, 608, 610, 612, 614, and 616, a notification window depicted as a header flag 702, and a cursor 704. As described relative to FIG. 6, the slider 602 is depicted at a location (e.g., the first location 618) in the graphical user interface (e.g., the search presentation interface 600) intersecting the axis 604, where the point of intersection defines a threshold value of the parameter represented by the axis 604.

FIG. 7 depicts a first user input initiating movement of the slider 602, by selecting the slider 602 with cursor 704. The cursor 704 may be controlled by a mouse or trackpad of client device 130. The user may initiate movement of the slider 602 by positioning the cursor 704 at a position on the slider 602, and depressing a mouse button. Responsive to receiving the first user input initiating movement of the slider 602, the presentation module 206 causes the presentation of the notification window as a header flag 702, at a location relative to the slider 602, such that the header flag 702 maintains the same relative position to the slider 602 as the slider 602 moves to a subsequent location in the search presentation interface 600.

As shown in FIG. 7, the header flag 702 indicates a numerical quantity of search results describing the quantity of search results included in a subset of search results defined by the location (e.g., the first location 618) of the slider 602 in the search presentation interface 600. For example, as show in FIG. 7, the header flag 702 indicates that there are twenty one search results within the subset of search results defined by the location of the slider 602 in the search presentation interface 600. In addition, the header flag 702 also indicates a value of a parameter of the search results. Here, header flag 702 indicates that the lowest priced search result in the subset of search results is $1,179. Thus, a user is provided with a quantity and a parameter value corresponding to the search results in real-time.

Figure 8:
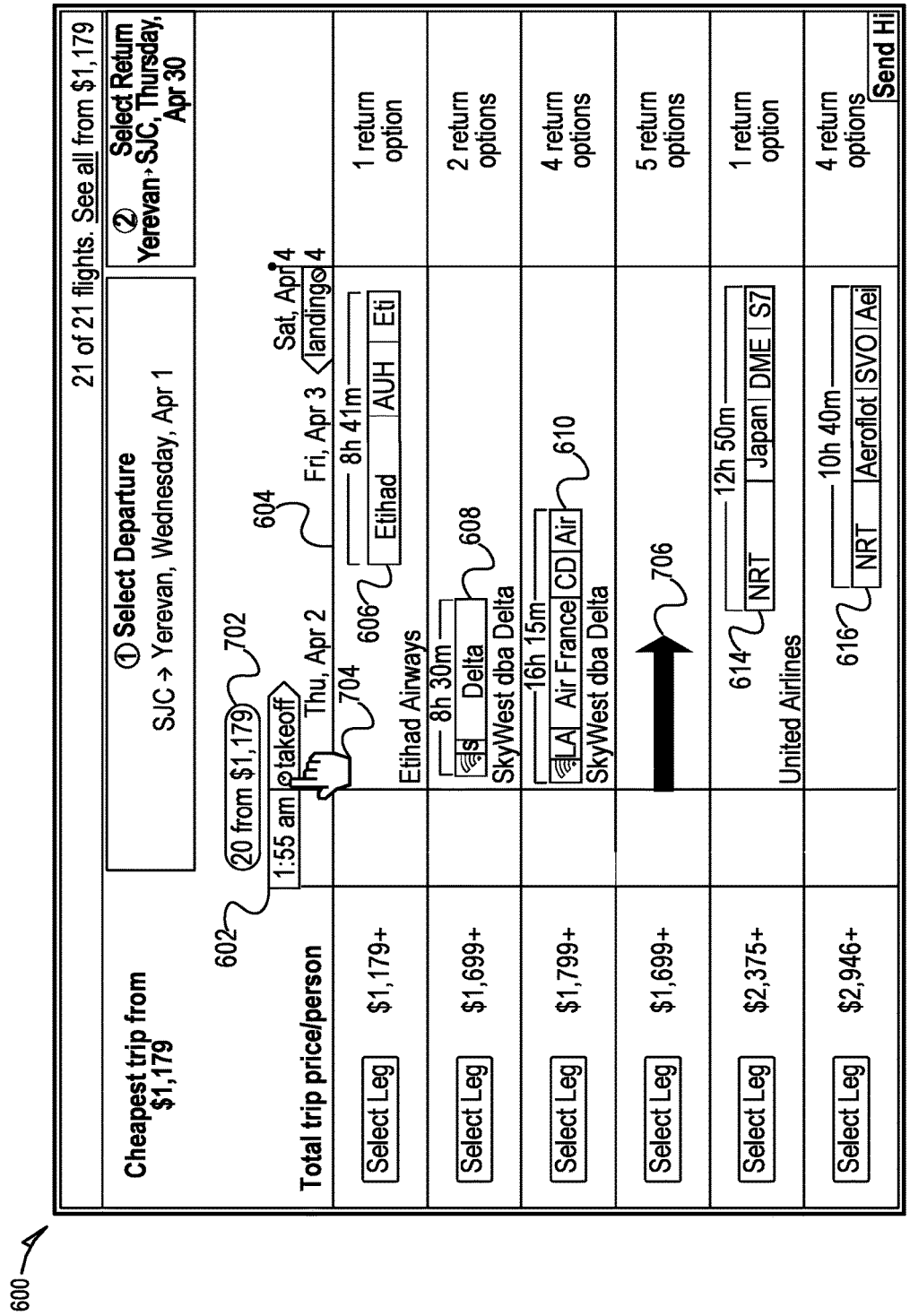
FIG. 8 is a diagram illustrating a search result presentation interface including one or more search results as graphical icons, a slider, and a dynamically updated header flag within a graphical user interface, according to some example embodiments.

As in FIG. 7, the slider 602 of FIG. 8 is shown receiving a user input via the cursor 704 moving the slider 602 from the first location 618 in the search presentation interface 600 to a subsequent location. Arrow 706 indicates a direction of movement of the slider in the graphical user interface. As the user moves the slider 602 to the subsequent location in the search presentation interface 600, the graphical user interface updates to display a second subset of search results, where the second subset of search results includes a different set of search results from the first subset of search results, and the header flag 702 updates to indicate a count and a minimum price value corresponding to the subset defined by the location of the slider 602, in real-time. As seen in FIG. 8, graphical element 612 of FIGS. 6 and 7 is no longer included in the subset of search results displayed in the graphical user interface. For example, as depicted in FIG. 8, as the slider 602 moves to the subsequent location, the count of search results is reduced from twenty one, as shown in FIG. 7, to twenty. As shown in FIG. 8, the search presentation interface 600 only shows search results included within the subset defined by the location of the slider 602.

Figure 9:
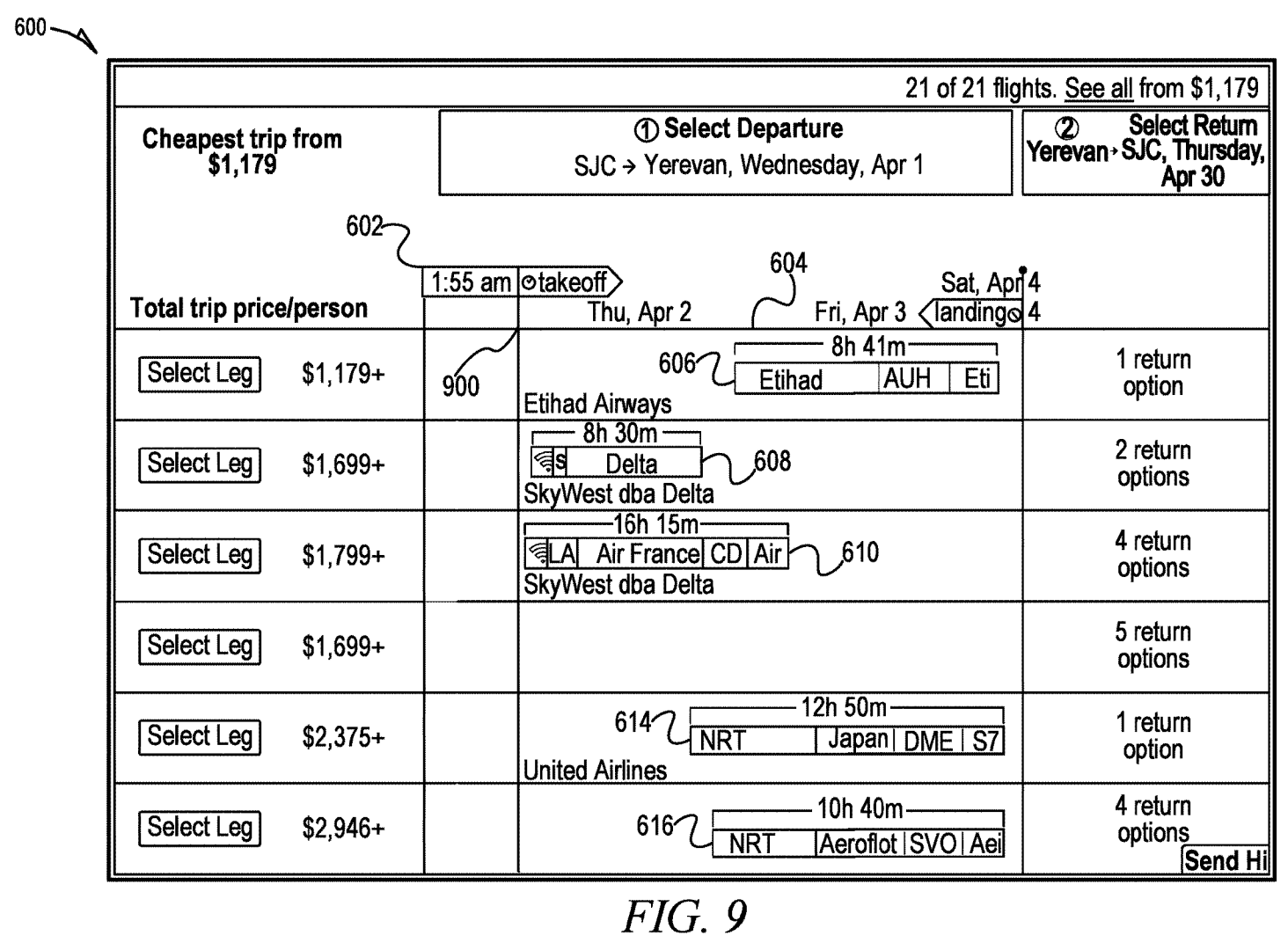

FIG. 9 is a diagram illustrating the search result presentation interface 600, with the slider 602 at a subsequent location (e.g., a second location 900) in the search result presentation interface 600, and a second subset of search results, including graphical elements 606, 608, 610, 614, and 616. As shown in FIG. 9, having placed the slider 602 at the second location 900, indicating a conclusion to the movement of the slider 602, the presentation module 206 causes the header flag 702 (e.g., of FIG. 7 and FIG. 8) to disappear from the search result presentation interface 600.

FIG. 10 is a diagram of the search result presentation interface 600, in a scenario where the user has moved the slider 602 in the same direction as in FIG. 8, represented by arrow 706, to a subsequent location 1000 in the search result presentation interface 600, such that the subsequent location 1000 defines a subset of the search results with a count of zero. As illustrated in FIG. 10, responsive to determining that the subset defined by the location of the slider has no search results, the presentation module 206 causes display of a header flag 1002, where the header flag 1002 includes a text notification indicating that there are no search results remaining (e.g., "No flights left!"). In some example embodiments the presentation module 206 may also indicate that the count of the search results is zero by depicting the header flag 1002 in a different color than usual (e.g., red, or black), or by causing the presentation of an auditory tone, to alert the user that there are no search results remaining to display.

Figure 11:
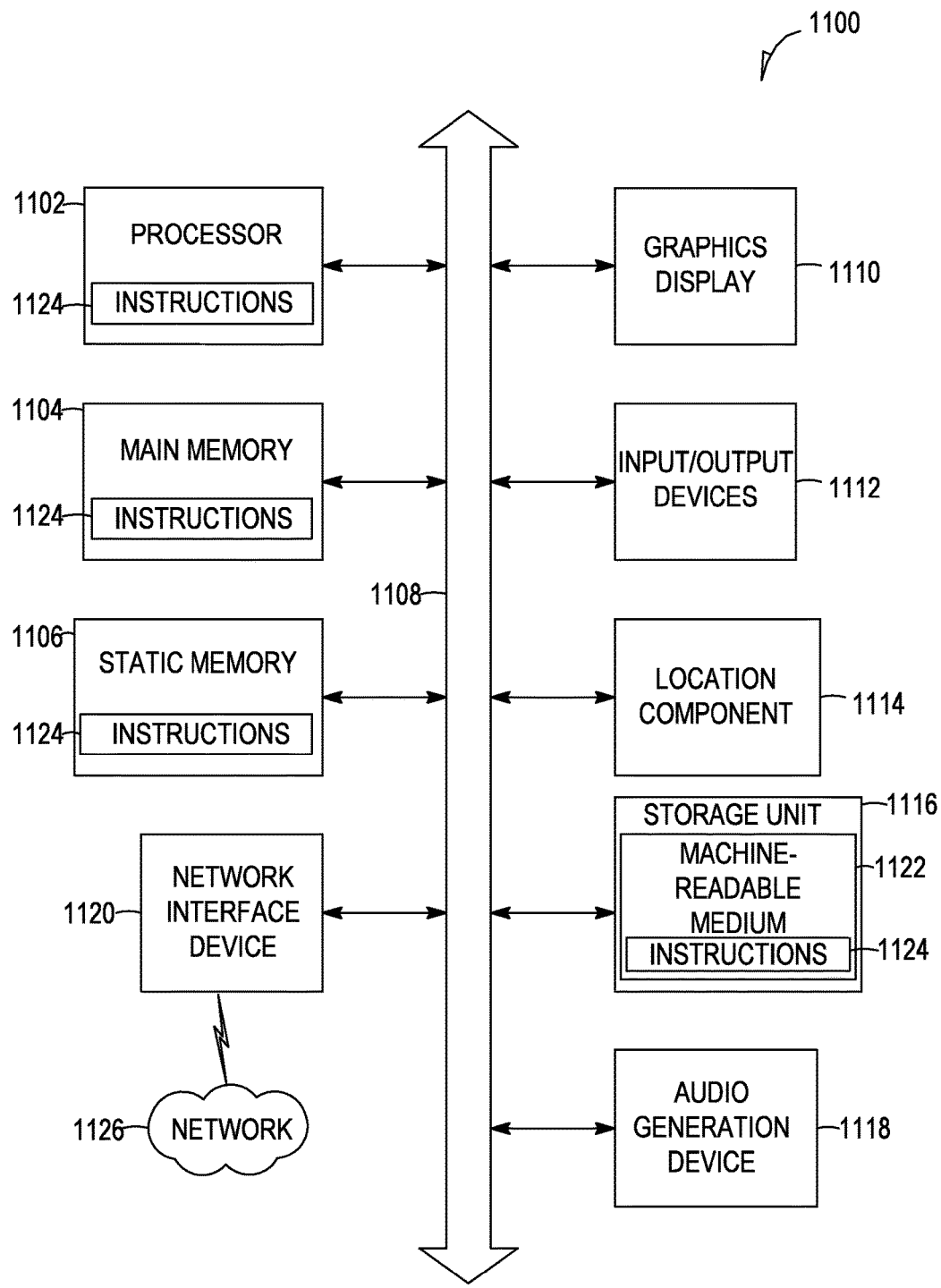
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a PC, a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1100 with at least the processor 1102, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an input/output device 1112 (e.g., a keyboard or keypad, mouse, trackpad), a location component 1114 (e.g., a global positioning system (GPS) receiver), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory Dale, an optical disc, a magnetic disc, or any suitable combination thereof. A "non-transitory" machine-readable medium, as used herein, specifically does not include propagating signals per se. In some example embodiments, the instructions 1124 for execution by the machine 1100 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1124).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   retrieving a set of search results, based on a search criteria that defines a parameter, the set of search results representable by a set of graphical elements, each graphical element in the set of graphical elements corresponding to a different search result in the set of search results;
   displaying an axis intersected by a slider with a first subset of the set of graphical elements in a graphical user interface, the axis representing a range of values of the parameter, and the slider being displayed at a first location along the axis, the first location of the slider at least partially defining a first value from the range of values of the parameter of the set of search results represented by the first subset of the set of graphical elements, the first subset having a first size quantified by a first count of graphical elements;
   detecting an initiation of a movement of the slider away from the first location along the axis in the graphical user interface;
   responsive to the initiation of the movement of the slider, causing display of a notification window in the graphical user interface, the notification window indicating a first quantity of search results by displaying the first count of graphical elements, the notification window being configured to follow the movement of the slider from the first location to a second location along the axis in the graphical user interface;
   detecting a conclusion of the movement of the slider from the first location to the second location along the axis in the graphical user interface, the second location of the slider at least partially defining a second value from the range of values of the parameter of the set of search results represented by a second subset of the set of graphical elements, the second subset having a second size quantified by a second count of graphical elements; and
   responsive to the conclusion of the movement of the slider, causing the notification window in the graphical user interface to indicate a second quantity of search results by displaying the second count of graphical elements.

2. The method of claim 1, wherein:
   the second subset has no graphical elements, and the second count of graphical elements is zero; and the method further comprises:
   responsive to the initiation of the movement of the slider, causing the notification window in the graphical user interface to indicate that there are no search results to be shown.

3. The method of claim 1, wherein:
   the slider intersects the axis at a point that defines a threshold value of the parameter, and the method further comprises;
   arranging the set of graphical elements within the graphical user interface based on values of the parameter in the search results represented by the set of graphical elements and based on the threshold value defined by the point.

4. The method of claim 1, wherein:
   the slider is a line segment having an end;
   the graphical user interface is configured to receive a user input to initiate the movement of the slider, and the notification window is depicted as a header flag at an offset distance from the end of line segment; and the method further comprises:
   responsive to receiving the user input initiating the movement of the slider, causing display of the header flag at the offset distance from the end of the slider, the header flag being displayed at the same offset distance from the end of the slider at the second location.

5. The method of claim 1, wherein:
   the set of search results includes a set of parameters that have corresponding values, and the notification window displays a value of a parameter from the set of parameters; and the method further comprises:
   responsive to the initiation of the movement of the slider, causing the notification window to display the value of the parameter from the set of parameters.

6. The method of claim 1, wherein:
   the set of search results have corresponding price values, each search result among the set of search results specifying a corresponding price value; and the method further comprises:
   responsive to the initiation of the movement of the slider, causing the notification window to display a first price from a first set of prices, wherein the first price is a lowest price among the first set of prices; and
   responsive to the conclusion of the movement of the slider, causing the notification window to display a second price from a second set of prices, wherein the second price is a lowest price among the second set of prices.

7. The method of claim 1, wherein:
   the set of search results specifies a set of airline flights represented by the set of graphical elements, wherein each airline flight among the set of airline flights has a corresponding departure time and a corresponding arrival time, and the method further comprises;
   displaying the slider as a first slider with the first subset of the set of graphical elements in the graphical user interface, the first slider indicating a threshold takeoff time of the first subset of the set of graphical elements; and displaying a second slider with the first subset of the set of graphical elements in the graphical user interface, the second slider indicating a threshold landing time of the first subset of the set of graphical elements.

8. The method of claim 1, wherein:
the movement of the slider is initiated by a drag input, the drag input including a first input selecting the slider and a second input placing the slider at a destination, the first input and second input received from a client device, and the method further comprises;
responsive to receiving the first input selecting the slider, causing the notification window to appear in the graphical user interface; and
responsive to receiving the second input placing the slider at the destination, causing the notification window to disappear from the graphical user interface.

9. A non-transitory machine-readable storage medium comprising instructions that, when executed by one or more processors of a machine, cause the machine to perform operations comprising:
by a search module comprising one or more processors, retrieving a set of search results based on a search criteria that defines a parameter, the set of search results representable by a set of graphical elements, each graphical element in the set of graphical elements corresponding to a different search result in the set of search results;
by a slider module comprising one or more processors, displaying an axis intersected by a slider with a first subset of the set of graphical elements in a graphical user interface, the axis representing a range of values of the parameter, and the slider being displayed at a first location along the axis, the first location of the slider at least partially defining a first value from the range of values of the parameter of the set of search results represented by the first subset of the set of graphical elements, the first subset having a first size quantified by a first count of graphical elements;
by the slider module, detecting an initiation of a movement of the slider away from the first location along the axis in the graphical user interface;
by a presentation module comprising one or more processors, responsive to the initiation of the movement of the slider, causing display of a notification window in the graphical user interface, the notification window indicating a first quantity of search results by displaying the first count of graphical elements, the notification window being configured to follow the movement of the slider from the first location to a second location in the graphical user interface;
by the slider module, detecting a conclusion of the movement of the slider from the first location to the second location along the axis in the graphical user interface, the second location of the slider at least partially defining a second value from the range of values of the parameter of the set of search results represented by a second subset of the set of graphical elements, the second subset having a second size quantified by a second count of graphical elements; and
by the presentation module, responsive to the conclusion of the movement of the slider, causing the notification window in the graphical user interface indicate a second quantity of search results by displaying the second count of graphical elements.

10. The non-transitory machine-readable storage medium of claim 9, wherein:
the second subset has no graphical elements, and the second count of graphical elements is zero; and the method further comprises:
responsive to the initiation of the movement of the slider, causing the notification window in the graphical user interface to indicate that there are no search results to be shown.

11. The non-transitory machine-readable storage medium of claim 9, wherein:
the slider intersects the axis at a point, wherein the point defines a threshold value of the parameters, and the method further comprises;
arranging the set of graphical elements within the graphical user interface according to at least the values corresponding to the parameter of the search results represented by the set of graphical elements and the threshold value defined by the point.

12. The non-transitory machine-readable storage medium of claim 9, wherein:
the slider is a line segment having an end and, the graphical user interface is configured to receive a user input on the line segment to initiate the movement of the slider, and the notification window is depicted as a header flag emerging from the line segment; and the method further comprises:
responsive to receiving the user input initiating the movement of the slider, causing display of the header flag at an offset relative to the slider, the header flag having the same offset relative to the slider at the second location.

13. The non-transitory machine-readable storage medium of claim 9, wherein:
the set of search results includes a set of parameters, the set of parameters having corresponding values, and the notification window displays a value corresponding to a parameter from among the set of parameters; and the method further comprises:
responsive to the initiation of the movement of the slider, causing the notification window to display the value corresponding to the parameter from among the set of parameters.

14. The non-transitory machine-readable medium of claim 9, wherein:
the set of search results have corresponding price values, each search result among the set of search results specifying a corresponding price value; and the method further comprises:
responsive to the initiation of the movement of the slider, causing the notification window to display a first price from a first set of prices, wherein the first price is a lowest price among the first set of prices; and
responsive to the conclusion of the movement of the slider, causing the notification window to display a second price from a second set of prices, wherein the second price is a lowest price among the second set of prices.

15. The non-transitory machine-readable medium of claim 9, wherein:
the set of search results specifies a set of airline flights represented by the set of graphical elements, wherein each airline flight among the set of airline flights has a corresponding departure time and a corresponding arrival time, and the method further comprises;
displaying the slider as a first slider with the first subset of the set of graphical elements in the graphical user interface, the first slider indicating a threshold takeoff time of the first subset of the set of graphical elements; and displaying a second slider with the first subset of the set of graphical elements in the graphical user interface, the second slider indicating a threshold landing time of the first subset of the set of graphical elements.

16. The non-transitory machine-readable medium of claim 9, wherein:

the movement of the slider is initiated by a drag input, the drag input including a first input selecting the slider and a second input placing the slider at a destination, the first input and second input received from a client device, and the method further comprises;

responsive to receiving the first input selecting the slider, causing the notification window to appear in the graphical user interface; and responsive to receiving the second input placing the slider at the destination, causing the notification window to disappear from the graphical user interface.

17. A system comprising:

a search module comprising one or more processors and configured to retrieve a set of search results based on a search criteria that defines a parameter, the set of search results representable by a set of graphical elements, each graphical element in the set of graphical elements corresponding to a different search result in the set of search results;

a slider module comprising one or more processors and configured to display an axis intersected by a slider with a first subset of the set of graphical elements in a graphical user interface, the axis representing a range of values of the parameter, and the slider being displayed at a first location along the axis, the first location of the slider at least partially defining a first value from the range of values of the parameter of the set of search results represented by the first subset of the set of graphical elements, the first subset having a first size quantified by a first count of graphical elements;

the slider module being further configured to detect an initiation of a movement of the slider away from the first location along the axis in the graphical user interface;

a presentation module comprising one or more processors and configured to, responsive to the initiation of the movement of the slider, cause display of a notification window in the graphical user interface, the notification window indicating a first quantity of search results by displaying the first count of graphical elements, the notification window being configured to follow the movement of the slider from the first location to a second location in the graphical user interface;

the slider module being further configured to detect a conclusion of the movement of the slider from the first location to the second location along the axis in the graphical user interface, the second location of the slider at least partially defining a second value from the range of values of the parameter of the set of search results represented by a second subset of the set of graphical elements, the second subset having a second size quantified by a second count of graphical elements; and the presentation module being further configured to, responsive to the conclusion of the movement of the slider, cause the notification window in the graphical user interface to indicate a second quantity of search results by displaying the second count of graphical elements.

18. The system of claim 17, wherein:

the second subset has no graphical elements, and the second count of graphical elements is zero; and the method further comprises:

responsive to the initiation of the movement of the slider, causing the notification window in the graphical user interface to indicate that there are no search results to be shown.

19. The system of claim 17, wherein:

the slider intersects the axis at a point, wherein the point defines a threshold value of the parameters, and the method further comprises;

arranging the set of graphical elements within the graphical user interface according to at least the values corresponding to the parameter of the search results represented by the set of graphical elements and the threshold value defined by the point.

20. The system of claim 17, wherein:

the slider is a line segment having an end and, the graphical user interface is configured to receive a user input on the line segment to initiate the movement of the slider, and the notification window is depicted as a header flag emerging from the line segment; and the method further comprises:

responsive to receiving the user input initiating the movement of the slider, causing display of the header flag at an offset relative to the slider, the header flag having the same offset relative to the slider at the second location.

* * * * *